US007726722B2

(12) United States Patent
Ray

(10) Patent No.: US 7,726,722 B2
(45) Date of Patent: Jun. 1, 2010

(54) MOTOR VEHICLE DOOR SYSTEM

(75) Inventor: Charles D. Ray, Santa Barbara, CA (US)

(73) Assignee: Novara, LC, Santa Barbara, CA (US)

( * ) Notice: Subject to any disclaimer, the term of this patent is extended or adjusted under 35 U.S.C. 154(b) by 534 days.

(21) Appl. No.: 11/613,651

(22) Filed: Dec. 20, 2006

(65) Prior Publication Data

US 2008/0150319 A1 Jun. 26, 2008

(51) Int. Cl.
*B60J 5/00* (2006.01)

(52) U.S. Cl. .................................................. 296/146.4

(58) Field of Classification Search .............. 296/146.4, 296/146.1, 146.8, 56; 49/503

See application file for complete search history.

(56) References Cited

U.S. PATENT DOCUMENTS 6,877,791 B2 4/2005 Greuel et al.
2005/0127687 A1 6/2005 Dimig
2005/0161891 A1 7/2005 Trudeau et al.
2005/0280518 A1 12/2005 Bartels et al.
2006/0112746 A1 6/2006 Thompson
2006/0181108 A1* 8/2006 Cleland et al. ........... 296/146.4
2007/0267888 A1* 11/2007 Vitale et al. .............. 296/146.4

OTHER PUBLICATIONS

PCT Search Report (mailed Sep. 29, 2008); 9 pgs.

* cited by examiner

*Primary Examiner*—Joseph D Pape
(74) *Attorney, Agent, or Firm*—Dicke, Billig & Czaja, PLLC

(57) ABSTRACT

A user-operated system for interactive vehicle door opening and closing. The system detects vehicle position (gravity) and external force (such as wind) and provides an assistive force in effortlessly opening or closing the door. In some embodiments, the system provides a fail safe mode of operation in case of power failure and/or limit stops to minimize or prevent damage to external objects in the event the door is inadvertently brought into contact with the external object.

11 Claims, 1 Drawing Sheet

MOTOR VEHICLE DOOR SYSTEM

FIELD OF THE INVENTION

The present invention relates to an interactive vehicle door, and more particularly, to a door opening and positioning mechanism that is responsive to both the orientation the vehicle, and forces acting on the door.

BACKGROUND

Present vehicle doors are invariably attached horizontally (or vertically) to a vehicle body by simple hinges, for example, having some form of mechanical detents that predetermine one or more positions of the door when opened. These door positions and the forces required to open the door are independent of, and not responsive to vehicle position, gravity or external forces that may inhibit or facilitate the opening or closing action. Thus, when the vehicle is parked on a non-horizontal surface or if an external force (i.e., wind) is applied, the person exiting or entering by the door commonly encounters undesirable forces that add to his efforts in opening or closing the door. The door may then suddenly open or close forcefully causing injury to the exiting person or adjacent structures.

These additional vehicle position and external forces particularly encumber the elderly, weak and/or disabled. Further, the predetermined detent positions do not account for variations in opening angles that can vary due to the proximity of external obstructions, adjacent vehicles, walls or objects. Nonetheless, such static, predetermined door positions are the standard mode utilized in the hinging of vehicle doors. In addition, fixed detents fail to address the many variations in force that act upon a vehicle door, including forces due to vehicle orientation and/or external forces. Additionally, on reaching the desired open position, the known vehicle door mechanisms fail to hold the door in the desired open position, and this is further aggravated by vehicle orientation and external forces.

With the above Background in mind, improvements to, and advancement of, vehicle door mechanisms will be welcomed by the motoring public.

SUMMARY

One aspect of the present invention provides a system for opening and closing a door attached to a vehicle. The system includes at least one vehicle position sensor configured to sense an orientation of the vehicle relative to horizontal and vertical reference frames, at least one door position sensor, an actuator coupled to the door and configured to open and close the door, a power source and power source controller electrically coupled to the actuator, and circuitry in electrical communication with the vehicle position sensor(s), the door position sensor(s), and the power source. In this regard, the circuitry determines a force to be delivered by the actuator in proportionally assisting an occupant of the vehicle in opening/closing the door.

Another aspect of the present invention provides a method of providing power assistance to a door attached to a vehicle. The method includes providing the vehicle with a power assistance system including a spatial sensor configured to sense gravitational forces acting on the door, a door sensor configured to sense a position of the door, and a powered actuator coupled to the door, the powered actuator electrically communicating with the spatial sensor and the door sensor. The method additionally includes sensing a real time sum of gravitational and external forces acting on the door. The method further includes powering the actuator to assist in opening/closing the door by offsetting the sum of gravitational and external forces acting on the door.

Other aspects of the present invention provide means to detect vehicle position relative to gravity and true vertical, and sensors to sense the force applied inside or outside in opening or closing the door as the occupant exits or enters. Additional aspects of the present invention provide sensors to detect a final vehicle door position as well as the resultant opening or closing velocity. In one embodiment, a computer system integrates this information and determines the actual and appropriate force required, balanced between that of the occupant or entrant person and that of a separate powered mechanism that forcefully acts in determining the final door position.

In one embodiment, the system also includes a contact detector on the most prominent projection of the door's outer margin to sense the encounter of an external obstruction, causing the opening force to be arrested. In addition, an indicator or alarm means is activated. The effort applied by the occupant is detected by a sensing means that is prominent and easily operated, such as an interactive force plate, knob or handle that is grasped or otherwise contacted by the occupant in the act of opening or closing the door. In one embodiment, the door closing and locking action is operated by the turn of an outside key or by action of a remote control.

In one embodiment, the power applied to door operation boosts the forces for opening and closing the door, much as does a power braking or power steering system of the vehicle. In one embodiment, the system employs a stand-by battery for use if the vehicle battery fails. In one embodiment, a detecting, integrating and actuating computer is employed in a remote location and protected against catastrophe much as an aircraft 'black box'.

The system also provides for safety overrides if the vehicle has lost power, is submerged or in an accident that may compromise door-opening action. Further, direct, keypad and remote locking-unlocking means of the system facilitate these functions as do normally present ones. The final assembly facilitates the opening or closing of the vehicle door under a wide range of gravitational and other external forces and the force applied by the occupant in exiting or entering the vehicle. The computer detecting, integrating and controlling the actions of the system directly regulates the forces applied as to strength and velocity, in opening or closing the door. The computer is redundant in that it includes more than one system and a separate isolated rechargeable battery for safety. In this regard, the computer system is configured to be recharged during normal vehicle use and is isolated from depletion in the case of the main vehicle battery failure or removal.

Aspects of the motor vehicle door system also provide for panic states in opening or closing the door, appropriately altering the force and velocity of door action. Additionally, in one embodiment a hydraulic or pneumatic accumulator (as used on truck brakes) maintains reserve power to assist in opening and closing functions in the event of battery power failure. Further, the control unit has redundant electrical and hydraulic or pneumatic connections to obviate failure by accidental impact that may distort the vehicle frame and structure that might obstruct vehicle exit or access by assisting persons. This feature is similar to that found in redundant aircraft controls. Another aspect of the present invention provides additional safety by reverting to the original mechanical hinge and detent door means, in case of the failure of the automatic, interactive power-assisted system as disclosed herewith. Still another aspect is a visual display of system status, door position and power source reserve and other pertinent parameters on the vehicle dash panel.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

Figure 1:
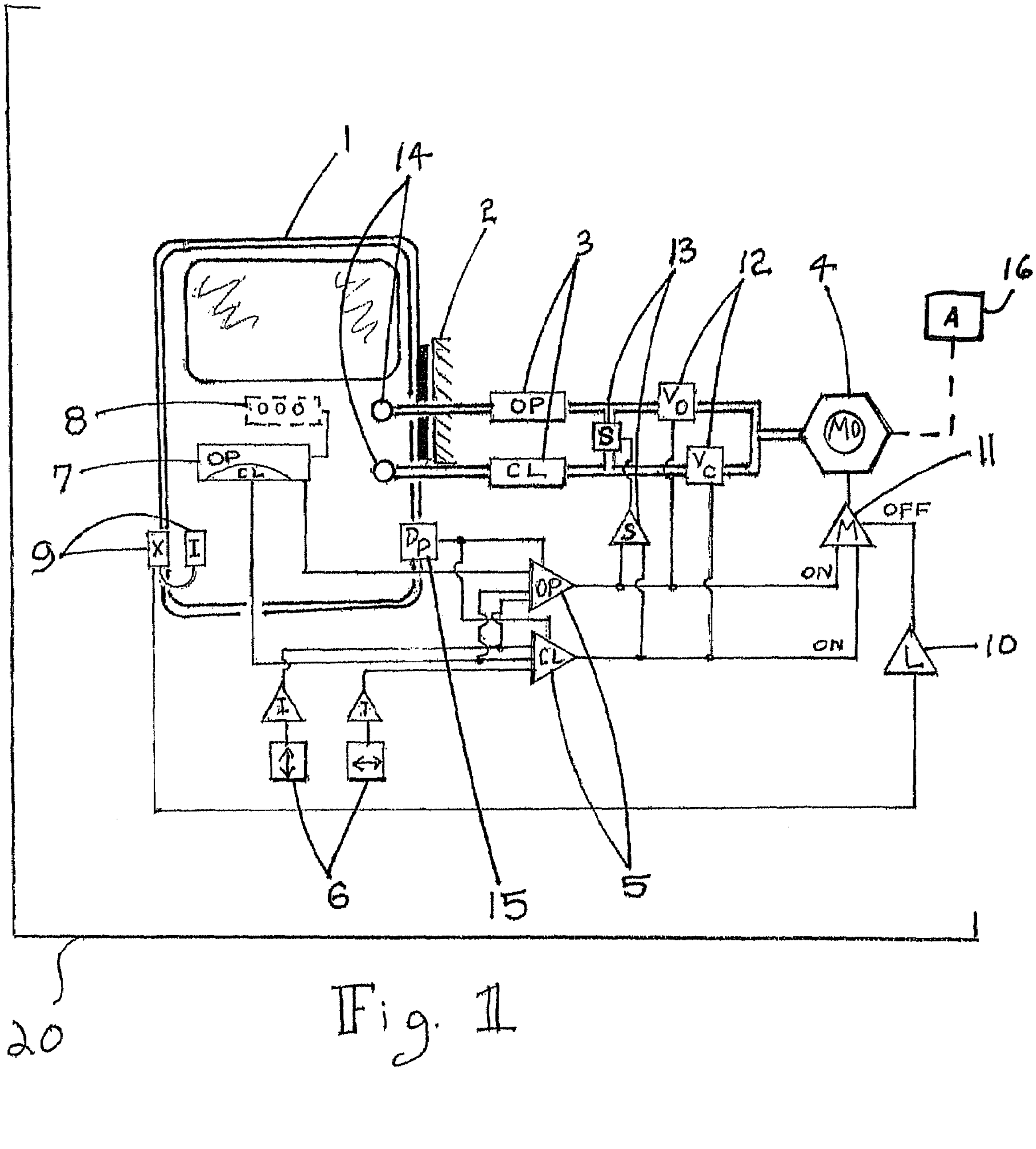
FIG. 1 illustrates a diagram of a system 20 for opening and closing a door attached to a vehicle according to one embodiment of the present invention.

In the following Detailed Description, reference is made to the accompanying drawings that form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

FIG. 1 illustrates a system 20 for opening and closing a door 1 attached to a vehicle 2. In general terms, the system 20 includes at least one vehicle position sensor 6 configured to sense an orientation of the vehicle 2 relative to horizontal and vertical reference frames; at least one actuator 3 coupled to the door 1 and configured to effectuate opening and closing of the door 1 relative to the vehicle 2; and a power source 4 coupled to, and prompting operation of, the actuator(s) 3. As described below, additional sensors and circuitry elements combine with information provided by the vehicle position sensor(s) 6 to operate the power source 4 in a manner causing a desired opening or closing of the door via the actuator(s) 3.

FIG. 1 illustrates embodiments of the invention where the sensing of external and internally applied forces is integrated, signal conditioned and caused to produce actuating forces. The resultant forces and positions of door opening, through feedback mechanisms, result in desired opening of the vehicle door. This position can thus be achieved while adverse conditions may be acting to inhibit or augment the act of door opening. Redundant and reserve energy sources and connections among components reliably and safely maintain proper door functions even in the event of power failure or vehicle accident.

With reference to FIG. 1, the vehicle door 1 is suitably hinged to the vehicle body 2. Powered actuators 3 (OP, CL) apply forces to open and close the door 1. In one embodiment, the actuators 3 include hydraulic actuators; in another embodiment the actuators include pneumatic or electrical actuators. A power source/controller 4 provides force to the actuator(s) 3, for example pressurized fluid delivered from a motorized pump (MO), or other suitable means such as an accumulator or electrical linear actuator. Operation of the power source/controller 4 is controlled by one or more suitable power differential amplifiers 5 for opening (OP) or closing (CL) of the door 1. The vehicle position sensor(s) 6, for example a geo-positional sensor, detects the vehicle forward-reverse inclination (I) and right-left lateral tilt (T), feeding these signals into circuitry configured to prompt/dictate operation of the power source 4. In one embodiment, the circuitry includes appropriate differential, control power amplifiers 5 having opening and closing (OP, CL) functions. A suitable inside occupant touch-pull sensitive pad 7 detects the force applied by the occupant, or an outside pad 8 detects the force applied by an entrant person, while opening or closing the door 1, feeding these signals into the appropriate differential power amplifiers 5.

In some embodiments, one or more limit detectors 9 are mounted on the door exterior rim (X) and/or interior door panel (I) to detect obstructions to door motion and force, with the limit signals passing through a limit control amplifier (L) 10 and then to a differential motor control amplifier (M) 11 to stop the power source/controller 4. In one embodiment, control valves 12 in the tubing from the power source/controller 4 permit opening (VO) or closing (VC) force to be applied to the appropriate actuators 3 (OP, CL). The detector(s) 9, or other similar circuitry or controller components, thus serve to minimize or prevent damage to external objects in the event the door 1 is forced into contact with the external object.

A fail-safe shunt valve 13 can optionally be provided that effectively releases the actuators 3 for free operation, thus overriding the power source/controller 4 to prevent the delivery of force to the actuators 3. The shunt valve 13, or similar circuitry or controller component(s), thus operates to provide a fail safe feature in the event of power failure.

In some embodiments, the actuators 3 press against mounted force pads 14 suitably attached to the door 1 and deliver the force from the power source/controller 4. The resulting door position (relative to the vehicle 2) is detected by a door position sensor 15 (DP) with connections into the differential power amplifiers 5 that integrate information from geopositional sensors 6 and operator push-pull pads 7, 8.

The pads 7, 8 in one embodiment are rate sensitive, thus applying the resultant assistive forces slowly or rapidly as detected by the extent and rate of force applied to them. These components prompt operation of the power source/controller 4 on demand. In some embodiments, the outside pad 8 is adapted to initiate the assistive system by a normal key or code button operated door lock. Door locking inhibits the system 20.

As referenced above, a door position sensor 15 detects the door position. Appropriate electronics (i.e., the circuitry of the system 20) differentially sense the balance between geographic vehicle position and forces applied by the operant person and the actuators as well as the force applied through the power source 4 and the valves to achieve appropriate opening or closing forces and door position.

The application of assistive forces to open or close the vehicle door 1, depending on vehicle geo-position and user-applied force is similar to a power braking or steering system except that the negative feedback control is not user (vehicle driver) performed but detector performed. In one embodiment, the shunt valve 13 across the two parallel actuator power source 4 tubes is normally open; becoming closed only when the system is initiated and force operated. This normally open shunting is the fail-safe portion of the system, reverting to the normal unassisted hinging of the vehicle door, in case of battery power or pump failure.

A hydraulic or pneumatic accumulator 16 may be used for reserve, stand-by force in the event of power or pump failure (e.g., the power source 4 fails). On parking and turning off the ignition of the vehicle 2, the door assistive system 20 continues to function by pressing or pulling on the inside or outside touch-pull pads 7, 8, energizing the system by direct battery power or reserve power from the above accumulator.

A remote or direct switch controller may optionally be provided in some embodiments. Similarly, a selective switch can be provided to guard against inadvertent passenger exit or undesirable intruder attempted entry. Further, the user may elect to disengage the system 20 at any time such as when under way. An additional control may permit the user to bias the rate of operation of door assistance. The system 20 is adaptable to vertically or horizontally hinged doors.

In this regard, in some embodiments the external and internal sensing means are force and position transducers appropriately located and removably affixed for best operation. During use, door opening and closing and limit stop limitations are all smoothly and effortlessly achieved by the user in opening or closing of the vehicle door, independent on the steepness or tilt of the street.

One skilled in the art will recognize that other electronic sensing, integrating, signal conditioning and the mechanical, hydraulic or pneumatic actuating components and designs may be substituted without changing the scope of the present invention.

In one embodiment, integration and supervising coordination of operation of the amplifiers, valves, actuators and sources and strengths of force augmentation and their sequencing are controlled by a central computer (not shown). The initiating positional detection is a combination of gravity and the attitude relative to a true vertical position. While the vehicle is in motion the output of these detectors, being pendulum operated in one embodiment, contact switches or a freely movable mass of liquid mercury, is defeated. When not moving and selectively the foot brake or the hand brake is applied or not or with the transmission in its 'Park' position, the novel system is in full operation. This allows for a guest, with assistance, to enter the vehicle while the operator is still inside with brakes applied and the transmission in a neutral or holding position.

Method and Example of Use

With reference to FIG. 1 the actual use and actions, are disclosed herewith. Initially, with the vehicle parked and its motor shut off, the vehicle operator engages the system 20 by key or external pad. He then pulls the door open 1, grasping the pull pad 8 means, energizing the system 20. When the pull means 7 is released, the door 1 stops in that position. The operator enters the vehicle 2 and pulls the closing pad 7 means that again energizes the system 20 to assist in closing. If an obstruction is encountered such as clothing or safety shoulder belt, the assistance ceases and resets allowing the door 1 to be opened again as needed to clear the obstruction. As the assisted door 1 swings open, if an external obstruction is encountered or the power continues but the position of the door 1 does not, indicating an obstruction, the assistance is ceased and the system reset for further manual control by the operator. Closure of the door must be complete in order to fully defeat the assistance. A partially closed door may then be assisted for full closure. When under way the system 20 ceases operation and the operator may open 1 the door slightly if needed only by prolonged pressure on the push pad 7. This permission for opening the door 2 while under way can be inhibited by switch control as needed.

When the vehicle 2 is parked and the hand brake is set or not but the transmission is in the park position, the assistance system 20 is energized but the obstruction limit switches remain active. When the operator ceases to press against the open force pad, the position of the door 1 'freezes' in that position, facilitating exit from the vehicle 2. Interrupted or incremental opening or closing of the door 1 therefore remains under constant user control, balanced by geopositional force, the force applied by the driver, the control computer and power amplifiers as described.

In the case of power failure, accident or drowning, the shunt valve 13 being normally open, reverts to and maintains the door function to its initial hinged condition. Under all conditions a small attitude display on the dash panel of the vehicle indicates the status of the doors, the force source, the actuators and geoposition.

ADVANTAGES

The invention augments the forces required to open or close a vehicle door and to hold the preferred door position, overcoming the counteractive forces of gravity and external weather conditions such as strong winds. The augmented force to open or close is actuated using an interactive mechanism, not unlike a power braking or steering system. The system and method are extremely reliable, stable and redundant, under control by the user at all times. The device and method can be used with or without direct vehicular power, as in the case of battery failure or removal or following an accident, as required by the circumstance. The user employing the system simply pushes against or pulls on a plate or knob attached to a sensor, that by feedback and computer signal conditioning, permits continuous adjustment of the force to open or close the door as needed. Thus external forces are balanced with the exertion of the user, requiring little force by the user to operate the door. The door may be hinged vertically or horizontally. In the unlikely event of compete failure of the assisting system, the normal unassisted mechanical door hinge, lock and opening mechanisms remain functional.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

While the preferred embodiments of the invention have been described, it should be understood that various changes, adaptations and modifications may be made therein by those skilled in the art without departing from the spirit of the invention and the scope of the appended claims.

The application of this boosted interactive door operating system is devoid of any undesirable side effect such as system failure or disablement by an accident. Both the instantaneous boosting and fail-safe effects are immediate and continuous. With the device disclosed herein, the person opening or closing the vehicle door advantageously feels an instant boost in power to overcome gravity or wind force that does not exist in standard door hinging and detent mechanisms. Further, an external detector stops the opening force in the event of an external obstruction, preventing damage to the door or the obstructing object. The system components are protected in crash-proof, fireproof containers and attached to the vehicle chassis in a variety of ways. Preferred means to deliver the force to open or close the door may be hydraulic, pneumatic or direct motor operated. Reserve power using an accumulator retains force to operate the door in case of complete failure of the input power supply. However, the original hinging and detent components of the standard vehicle door remain in position and can be resorted to in the case of complete system failure. The sources of system power, reserve and back-up are disclosed here although persons skilled in the electrical and mechanical arts can adapt the concept to a variety of means to cause desirable, balanced power-assisted door opening and closing.

What is claimed is:

1. A system for opening and closing a door attached to a vehicle, the system comprising:

at least one vehicle position sensor configured to sense an orientation of the vehicle relative to horizontal and vertical reference frames;

at least one door position sensor for sensing a position of the door relative to the vehicle;

at least one actuator coupled to the door and configured to effectuate at least one of the opening and closing the door relative to the vehicle;

a power source coupled to the actuator;

at least one force pad attached to the door and configured to sense a force applied to the door; and circuitry electronically coupled to the least one vehicle position sensor, the at least one door position sensor, the at least one force pad, and the power source;

wherein the circuitry prompts operation of the power source at a level based upon information from the vehicle position sensor, the door position sensor and the at least one force pad to proportionally assist in moving the door.

2. The system of claim 1, wherein the circuitry determines a force to be delivered by the actuator based upon gravitational forces acting on the door as sensed by the at least one vehicle position sensor.

3. The system of claim 1, wherein the at least one force pad comprises:

an interior pad attached to an interior side of the door and configured to sense a force applied to the door by an occupant of the vehicle;

wherein the circuitry determines a force to be delivered by the actuator in proportionally assisting the occupant of the vehicle in moving the door based upon the force sensed by the interior pad.

4. The system of claim 3, wherein the interior pad includes a switch electronically coupled to the power source to energize the power source when the occupant contacts the interior pad.

5. The system of claim 1, wherein the at least one force pad comprises:

an exterior pad attached to an exterior side of the door and configured to sense a force applied to the door by a user of the vehicle;

wherein the circuitry determines a force to be delivered by the actuator in proportionally assisting the user of the vehicle in moving the door based upon the force sensed by the exterior pad.

6. The system of claim 5, wherein the exterior pad includes a switch electronically coupled to the power source to energize the power source when the user contacts the exterior pad.

7. The system of claim 1, further comprising:

a shunt valve coupled to the actuator and configured to selectively disengage the actuator.

8. The system of claim 1, further comprising:

at least one limit detector mounted on the door and configured to sense an obstruction preventing complete moving of the door to one of an open position and a closed position.

9. The system of claim 1, wherein the at least one force pad comprises:

an interior pad attached to an interior side of the door and configured to sense a force applied to the interior of the door by a user of the vehicle;

an exterior pad attached to an exterior side of the door and configured to sense a force applied to the exterior of the door by the user of the vehicle;

wherein the circuitry determines a force to be delivered by the actuator in proportionally assisting the user of the vehicle in moving the door based upon the force sensed by at least one of the interior pad and the exterior pad.

10. The system of claim 1, further comprising:

a power accumulator coupled to the power source and configured to store a reserve amount of energy useful in powering the actuator in low energy conditions.

11. The system of claim 1, further comprising:

an override switch coupled to the power source and configured to selectively disable the power source based upon a user input.

* * * * *